United States Patent [19]
Jacobsen et al.

[11] Patent Number: 5,109,701
[45] Date of Patent: May 5, 1992

[54] FIELD-BASED MOVEMENT SENSOR

[75] Inventors: Stephen C. Jacobsen; John E. Wood, both of Salt Lake City, Utah

[73] Assignee: Sarcos Group, Salt Lake City, Utah

[21] Appl. No.: 686,608

[22] Filed: Apr. 17, 1991

Related U.S. Application Data

[62] Division of Ser. No. 580,779, Sep. 11, 1990, Pat. No. 5,016,481.

[51] Int. Cl.⁵ .............................................. G01B 7/16
[52] U.S. Cl. ........................................................ 73/782
[58] Field of Search ................ 73/782, 862.68, 862.64, 73/777, 779, 780; 357/25

[56] References Cited

U.S. PATENT DOCUMENTS

| | | | |
|---|---|---|---|
| 4,092,856 | 6/1978 | Kanda . | |
| 4,308,929 | 1/1982 | Estavoyer | 177/210 C |
| 4,572,006 | 2/1986 | Wolfendale | 73/862.64 |
| 4,649,759 | 5/1987 | Lee | 73/862.64 |
| 4,767,973 | 8/1988 | Wood | 318/652 |
| 4,825,701 | 5/1989 | Holtslander | 73/782 |

OTHER PUBLICATIONS

Experimental Stress Analysis by James W. Dally & William F. Riley.
Handbook of Engineering Fundamentals by Ovid W. Eshbach & Mott Souders.
Instrumentation for Engineering Measurements by James W. Dally & Kenneth G. McConnell & William F. Riley.
Mechanical Measurements by Thomas G. Beckwith, N. Lewis Buck & Roy D. Marangoni.

*Primary Examiner*—Jerry W. Myracle
*Attorney, Agent, or Firm*—Thorpe, North & Western

[57] ABSTRACT

A field-based movement sensor adapted for measuring strain along a certain axis in an object on which the sensor is attached. The sensor includes a substrate having a working surface and formed with a pair of fingers projecting from a first direction, and a third finger projecting from a direction oppposite the first direction, to a position between the pair of fingers. The pair of fingers and third finger extend generally perpendicular to the axis along which strain is to be measured, with the pair of fingers being moveable with respect to the third finger along the axis when the strain occurs. An electrically charged element for producing an electric field is disposed on the working surface of the third finger, and a pair of field-effect transistors (FETS) are each disposed on a working surface of a different one of the pair of fingers. As the object is subjected to strain causing the pair of fingers to move relative to the third finger, the variations in the strength of the electric field from the charged elements to the FETS is determined and this provides a measure of the variation in distance between the third finger and the pair of fingers and this, in turn, provides a measure of the strain in the object to which the substrate is attached.

1 Claim, 4 Drawing Sheets

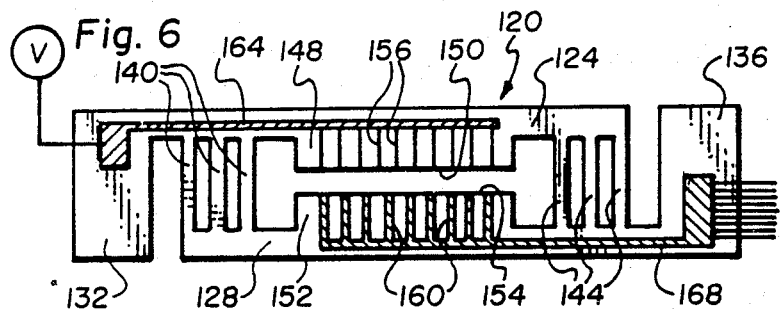
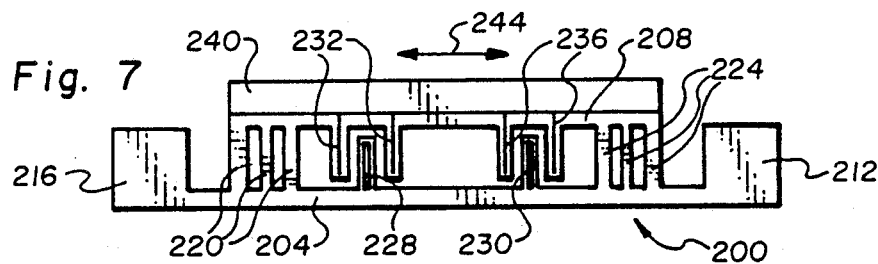
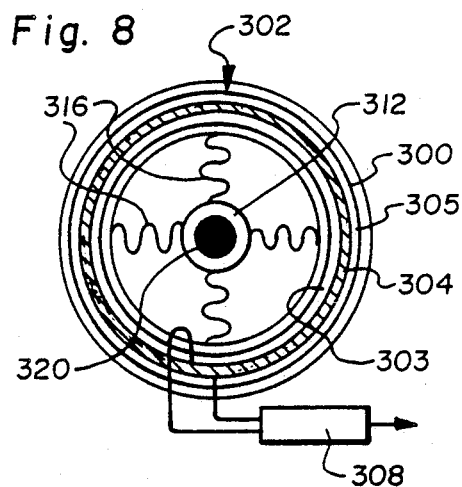
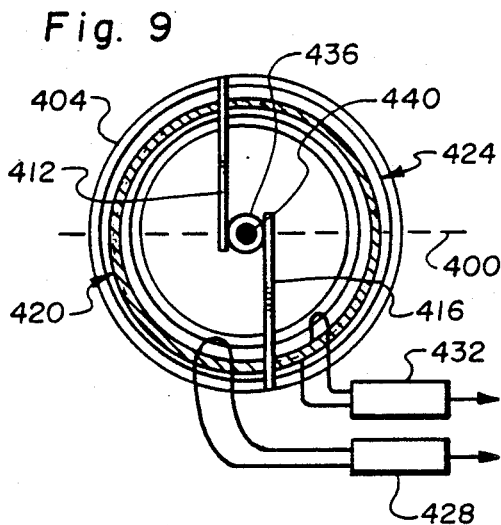
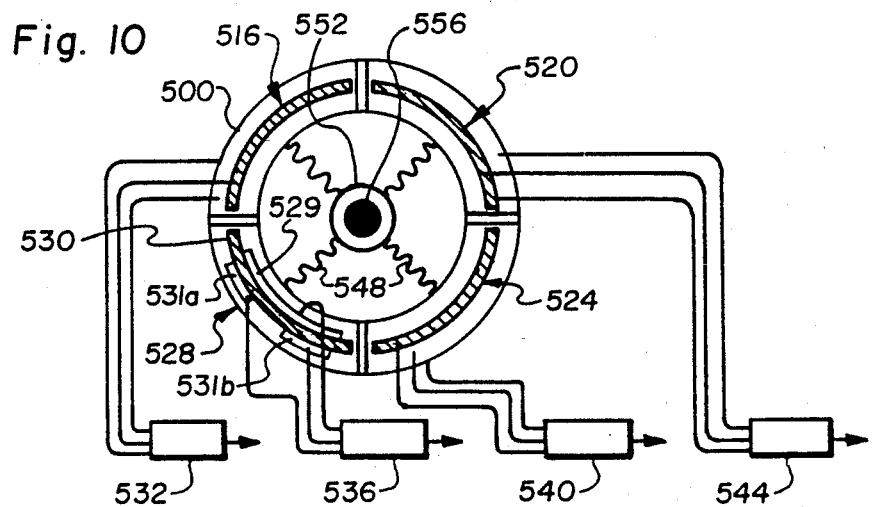

FIELD-BASED MOVEMENT SENSOR

This is a division of application Ser. No. 580,779, filed Sep. 11, 1990, now U.S. Pat. No. 5,016,481.

BACKGROUND OF THE INVENTION

This invention relates in general to apparatus for sensing movement, and in particular instances to devices for measuring strain in an object and devices for measuring acceleration.

Measurement of strain (the change in length of an object in some direction per unit undistorted length) in specimens and objects may be carried out either directly or indirectly. Some of the approaches used for direct strain measurements include the use of bonded wire strain gages (in which a grid of strain-sensitive wire is cemented to a specimen so that a change in the length of the grid due to strains in that specimen changes the resistance of the wire which can then be measured), mechanical strain gages (in which optical or mechanical lever systems are employed to multiply the strain which may then be read from a suitable scale), magnetic strain gages (which include magnetic circuits having air gaps which, when varied as a result of a strain in the specimens, varies the permeance of the circuits to provide an indication of the strains produced), semiconductor strain gages (in which the resistance of a piezoresistive material varies with applied stress and resulting strain in the material), and capacitance strain gages (in which a variation of capacitance caused by variation in the separation of elements due to strain in the specimen, can be measured to provide a reading of the strain). Other direct strain measuring devices include acoustic strain gages, brittle lacquer coatings, photo grids and cathetometers.

Approaches for indirectly measuring strain in a specimen include the use of displacement pickup devices, velocity pickup devices and acceleration detection devices.

A disadvantage of the conventional approaches to measuring strain (or forces include those produced by acceleration, weight, or the like), is that the devices employed are oftentimes difficult to attach to or to use with a specimen whose strain is to be measured. Also, such devices are typically difficult and costly to manufacture. Finally, because of the intrinsically high axial rigidity of many of such devices, it requires high quality bonding of the device to the specimen to prevent detachment due to failure of the bond and this, in turn, requires time-consuming and careful preparation of the specimen for bonding.

One approach to measuring forces in general has included the use of a parallelogram-type structure in which are mounted capacitive elements arranged to measure forces applied to the structures. Examples of some such devices include those disclosed in U.S. Pat. Nos. 4,092,856, 4,308,929, 4,572,006, and 4,649,759. All but one of the devices disclosed in these patents utilize variation of capacitance resulting from variation in the separation of the capacitive elements as the mechanism for measuring force. The capacitive elements are mounted on the structures in face-to-face relationships and so the structures are typically fairly bulky, having non-planar profiles. Such structures would be difficult to adapt for use as strain gages since, because of their bulk and size, it would be difficult to attach the structure to specimens or objects in which strain is to be measured. Also, fabricating the structures with the capacitive elements in the face-to-face relationship is quite difficult since multiple surfaces or faces of the structure must be prepared and treated.

SUMMARY OF THE INVENTION

It is an object of the invention to provide a movement sensor which is easy to fabricate, simple in design and readily usable for measuring a variety of forces and movement imposed generally along an axis.

It is also an object of the invention to provide such a sensor which has a relatively low, flat profile suitable for attaching to an object in which strain is to be measured.

It is a further object of the invention to provide such a sensor which is relatively small in size and well-suited for use with semiconductors and integrated circuits.

It is an additional object of the invention to provide such a sensor which can be fabricated utilizing conventional integrated circuit fabrication technology.

It is also an object of the invention to provide such a sensor in which a single surface mounting of force or movement measuring elements is possible.

The above and other objects of the invention are realized in one specific illustrative embodiment of a movement sensor adapted for measuring movement or strain along a certain axis in an object to which the sensor is attached. The sensor includes a substrate having a working surface and formed with a pair of fingers projecting from a first direction, and a third finger projecting from a direction opposite the first direction to a position between the pair of fingers. The pair of fingers and third finger extend generally perpendicular to the axis along which strain is to be measured, with the pair of fingers being movable with respect to the third finger along the axis when the strain occurs in the object. A force field producing element, such as an electrically charged element or a magnetic field-producing element, is disposed on the working surface of the third finger, and a pair of force field detecting elements, such as a field-effect transistor capable of detecting electric fields or split drain magnetic field-effect transistors capable of detecting magnetic fields, are each disposed on a working surface of a different one of the pair of fingers. As the object on which the substrate is attached is subjected to strain causing the pair of fingers to move relative to the third finger, the variations in the strength of the force field from the force field producing element to the force field detecting elements is determined and this provides a measure of the variation in distance between the third finger and the pair of fingers. The variation in distance between the fingers, in turn, provides a measure of the strain in the object to which the substrate is attached.

BRIEF DESCRIPTION OF THE DRAWINGS

The above and other objects, features and advantages of the invention will become apparent from a consideration of the following detailed description presented in connection with the accompanying drawings in which:

FIG. 6 shows a top, plan view of another embodiment of a strain transducer made in accordance with the principles of the present invention and which also utilizes the Vernier principle.

FIG. 7 shows a top, plan view of an acceleration force transducer made in accordance with the principles of the present invention;

FIG. 8 shows a top plan view of an embodiment of a force transducer made in accordance with the principles of the present invention in which magnitude but not directional force can be determined;

FIG. 9 shows a top plan view of a uniaxial force transducer in which magnitude and two direction of force can be determined;

FIG. 10 shows the top, plan view of a biaxial force transducer in which magnitude and four directions of force can be determined;

DETAILED DESCRIPTION

Figure 1:
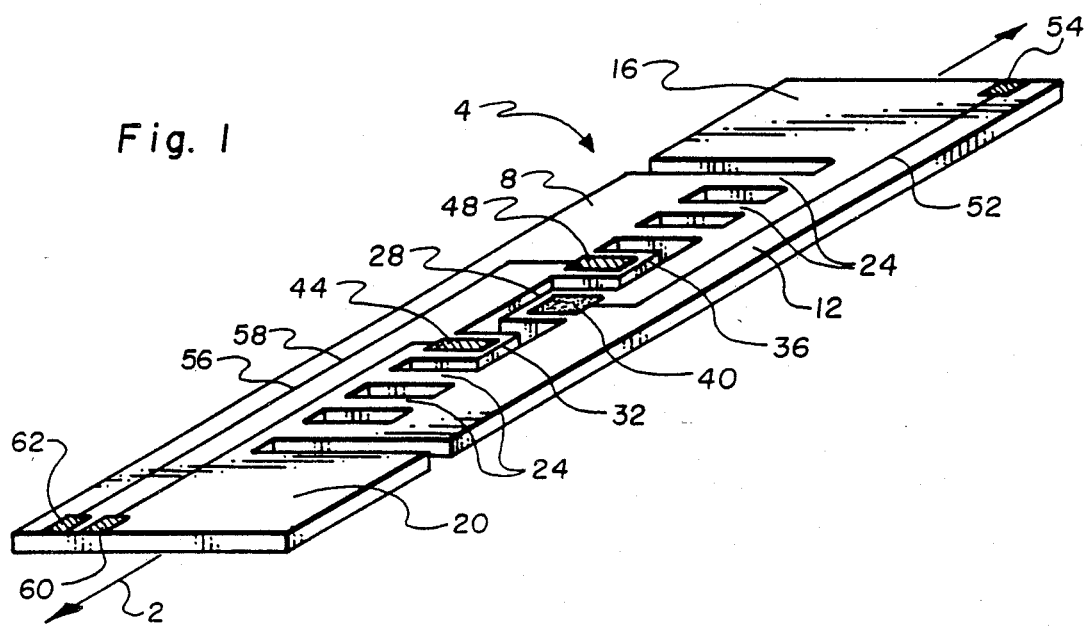
FIG. 1 is a perspective view of a flexible uniaxial strain transducer made in accordance with the principles of the present invention.

Referring to FIG. 1 there is shown one illustrative embodiment of a flexible uniaxial strain transducer for measuring the strain in an object to which or on which the transducer is attached. The transducer includes a generally planar, low-profile silicon substrate frame member 4 having a top working surface on which working parts of the transducer are disposed, and a bottom surface. The frame member 4 includes a pair of generally parallel load-bearing beams or side rails 8 and 12 which are movable longitudinally with respect to one another when the object on which the transducer is attached is subject to strain. Formed on respective ends of the beams 8 and 12, at opposite ends, are bonding pads 16 and 20. The bonding pads are generally co-planar with the beams 8 and 12 and extend from the respective beam on which they are formed to a location adjacent to and spaced from the end of the other beam. The bonding pads 16 and 20 allow for attaching the transducer by a suitable adhesive to the object in which the strain is to be measured. A plurality of laterally flexible connecting beams or struts 24 extend between and connect the beams 8 and 12. The struts 24 are generally perpendicular to the beams 8 and 12, as shown in FIG. 1. A first projection 28 extends from beam 12 toward beam 8 to a location between a second projection 32 and a third projection 36, both of which extend from beam 8 toward beam 12.

Disposed on and formed, for example, by conventional microfabrication techniques on the working surface of projection 28 is an emitter 40 for developing an electric field. The emitter, for example, might illustratively be a charged electric conductor. Disposed on and formed, for example, also by conventional microfabrication techniques such as vacuum deposition on the working surface so projections 32 and 36 are two detectors which, in this embodiment, are field-effect transistors (FETS) 44 and 48 respectively. A conductor 52 connects the conductive emitter 40 to an edge electrical contact pad 54 for connecting to an electrical charge source and conductors 56 and 58 connect respectively FET 44 and FET 48 to edge electrical contact pads 60 and 62 for connecting to sensor circuitry such as that shown in FIG. 3.

The emitter 40 might alternatively be a layer of material containing positive or negative charges. For example, the emitter could illustratively be a layer of polytetrafluoroethylene with electrons implanted therein.

The FETS 44 and 48 include conductive gates which are influenced by the electric field produced by the conductive emitter 40, with the degree of influence being determined by the spacing between the projection 28 and respective projections 32 and 36, i.e., the separation between the source of the electric field and the conductive gates of the FETS. The operation of FETS is well-known as is the effect of an electric field on the conductive gate of an FET. The FET includes two conductive regions, known as the drain and source regions, separated by a channel region which is conductive. The drain region and source region are maintained at different electrical potentials so that electric current is caused to flow between the regions through the channel. The gage of an FET is positioned adjacent the channel region and when the FET is exposed to an electric field, an electrical charge is induced on the surface of the gate to affect the conductivity of the channel region. This in turn determines the magnitude of the electrical current which flows between the drain region and the source region. While measuring this electrical current flow, a determination can be made as to the proximity of the source of an electric field positioned near the FETS. A further discussion of this phenomenon is found in U.S. Pat. No. 4,767,973, issued Aug. 30, 1988, which is incorporated herein by reference.

Although the FIG. 1 embodiment is shown using a conductive emitter 40 and FETS 44 and 48, it should be understood that alternatively, the conductive emitter 40 could be replaced with a magnetic field emitter such as a permanent magnet or an electromagnet and the FETS could be replaced with split drain magnetic FETS (MAGFETS) capable of detecting magnetic fields. Then, the MAGFETS would detect the spacing between each of the MAGFETS and the permanent magnet located on projection 28.

Briefly, a MAGFET is a metal-oxide semiconductor field-effect transistor (MOSFET) with two drains, i.e., the MAGFET has a source region, two drain regions, a conductive channel region between the source region and two drain regions, and a gate located adjacent to the channel region. In the absence of a magnetic field, current flows from the source region through the channel region equally to the two drain regions. When a magnetic field is present, the current through the channel region is deflected to flow more to one drain region than the other, with the magnitude of the deflection and thus imbalance of current flowing to the two drain regions being dependent upon the intensity of the magnetic field. Measuring the current imbalance in the two drain regions thus provides a measure of the proximity of a magnetic field source to the MAGFET.

The FIG. 1 embodiment shows the use of two detectors (FETS 44 and 48) positioned on either side of one emitter 40 and the advantage of this two-detector arrangement will be made clear momentarily. However, it should be recognized that use of a single detector disposed on one projection, positioned on one side of the emitter 40, could also serve to detect strain, i.e., movement of bonding pad 16 relative to bonding pad 20, as will be discussed in connection with FIGS. 2A and 2B.

Figure 2A:
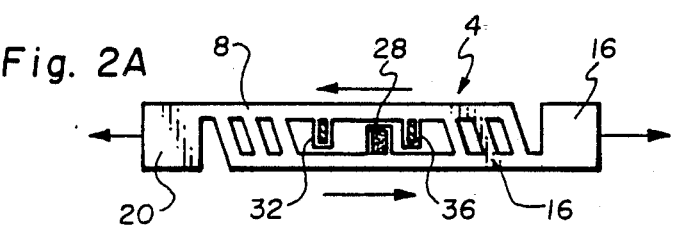
FIGS. 2A and 2B show top plan views of the transducer of FIG. 1 when under tensile strains and compressive strains respectively.
Figure 2B:
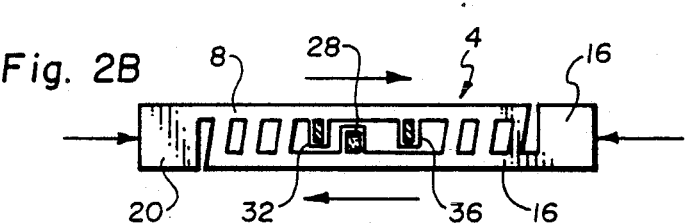

FIGS. 2A and 2B show, in an exaggerated fashion, the effect on the transducer 4 of a stress (pulling apart) and a compressive force (squeezing together) respectively. In FIG. 2A, the affect of a stress on the object on which the transducer 4 is disposed in that bonding pads 16 and 20 are pulled apart and projection 28 thus moves away from projection 32 and toward projection 36 as shown. The FET deposited on projection 36 thus detects the increase in strength of the electric field being produced by the conductive emitter on projection 28 and thus the magnitude of movement of the projection 28 toward the projection 36, whereas the FET on projection 32 detects the decrease in the strength of the electric field and thus the magnitude of the movement of the projection 28 away from the projection 32. The difference between the increase in the strength of the electric field and the decrease in the strength of the electric field may be determined by a differential circuit shown in FIG. 3 to produce a resultant signal which more accurately indicates the magnitude of movement of the beams 8 and 12 relative to one another to thereby accurately measure the strain developed in the object on which the transducer 4 is mounted.

FIG. 2B shows, in exaggerated form, the affect of a compressive force applied to the transducer 4 in which case projection 28 is moved closer to projection 32 and farther away from projection 36. Again, the distance of this movement can be measured by the FETS located on projections 32 and 36 as earlier described.

Although the substrate frame 4 was described as being made of silicon, it could also be made of other materials such as polysilicon, sapphire, amorphous silicon, germanium, gallium arsenide, etc. Also, although the entire FETS were described as being deposited on projections 32 and 36, it may be desirable to simply deposit the gages of the FETS on those projections and deposit the remaining parts of the FETS remotely from the gates either on the frame 4 or at some other location. In such case, the gages on the projections 32 and 36 would be coupled by appropriate conductors to the respective FETS of which they would be a part.

Figure 3:
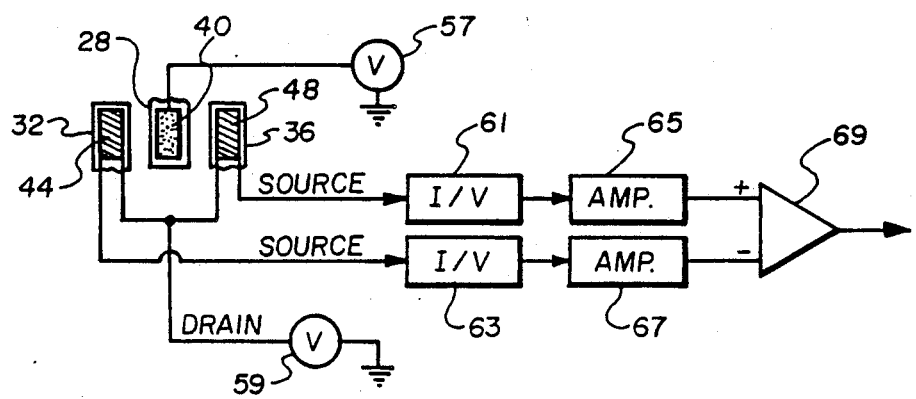
FIG. 3 is a schematic of an exemplary circuit which may be utilized for producing a signal indicative of the strain to which the FIG. 1 transducer is subjected.

FIG. 3 is a schematic of one illustrated differential circuit which could be utilized with the transducer of FIG. 1 to measure movement of the projections 32 and 36 relative to the projection 28 and thus strain in an object on which the transducer is mounted. The circuit includes a charge source or voltage source 57 coupled to the emitter 40 on projection 28, a voltage source 59 coupled to the drain regions of the FETS 44 and 48, two current-to-voltage converters 61 and 63, each coupled to a respective source region of the FETS 44 and 48, and two voltage amplifiers 65 and 67. The polarities of the voltage signals produced by the amplifiers 65 and 67 are opposite, and these signals are supplied to a comparator 69 which produces an output signal whose amplitude is proportional to the difference in magnitude of the input signals (indicating the magnitude of movement of the projections 32 and 36 relative to projection 28), and whose polarity is determined by the direction of movement of the projections. In this manner, both the magnitude of the strain in the object being measured and whether the strain is tensile or compressive can be determined.

Figure 4:
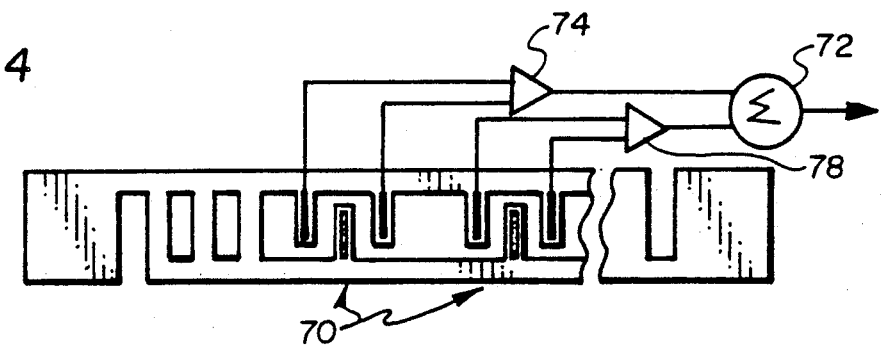
FIG. 4 shows a top plan, fragmented view of a strain transducer which includes a plurality of sensor combinations.

FIG. 4 shows a fragmented transducer having multiple sets 70 of two projections containing detection elements and one projection situated between the two projections, containing a force field producing element. By providing multiple sets of such force field producing elements and detection elements, the signal outputs can be summed to provide a better signal-to-noise ratio for the transducer. A summing amplifier 72 is shown coupled to the outputs of two comparators 74 and 78.

Figure 5A:
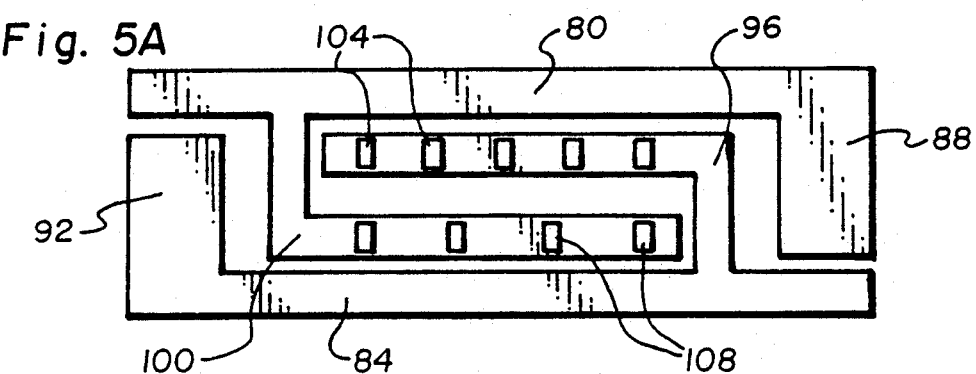
FIG. 5A shows a top, plan view of another embodiment of a strain transducer made in accordance with the principles of t he present invention and which utilizes the Vernier principle of measurement.

FIG. 5A shows a top, plan view of another embodiment of a strain transducer constructed of two pieces, both of which would be applied to the object in which strain was to be measured. The transducer of FIG. 5A includes a pair of load-bearing, spaced-apart generally parallel rails 80 and 84. A bonding pad 88 is joined to one end of the rail 80 to extend toward and end of the rail 84, and a bonding pad 92 extends from the other end of the rail 84 toward an end of the rail 88 as shown. The bonding pads 88 and 92 are provided for attaching the transducer to an object in which strain is to be measured.

Figure 5B:
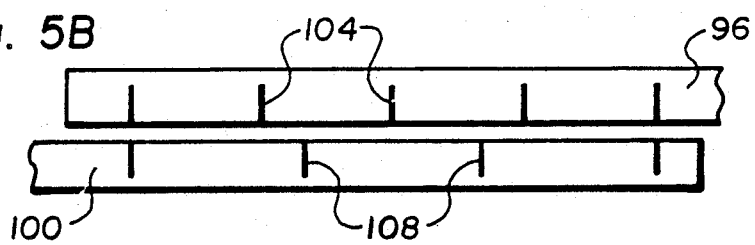
FIGS. 5B, 5C and 5D show graphic representations of the use of the strain transducer of FIG. 5A.

Also included are a pair of arms 96 and 100 extending respectively from rails 84 and 80 to positions generally parallel with and side-by-side with one another. Arm 96 is positioned between arm 100 and rail 80, whereas arm 100 is positioned between arm 96 and rail 84. A plurality of force field emitters 104 are spaced apart longitudinally along arm 96 in a multiplicity (one less than the number of force field emitters) of force field detector elements are spaced apart longitudinally along arm 100. As can be seen, the endmost force field emitters of the array are positioned opposite respective endmost lines of the force field detector elements, when the transducer is not being subjected to a stress or a compressive force. FIG. 5B better illustrates the positions of the force field emitters 104 relative to the force field detector elements 108 when the transducer is in the no or zero strain condition. The configuration of force field emitters 104 relative to the force field detector elements 108 is similar to a Vernier scale arrangement. That is, a small movement of the arms 96 and 100 relative to one another to increase the sensitivity of the transducer to strains occurring in the object on which the transducer is mounted.

Figure 5C:
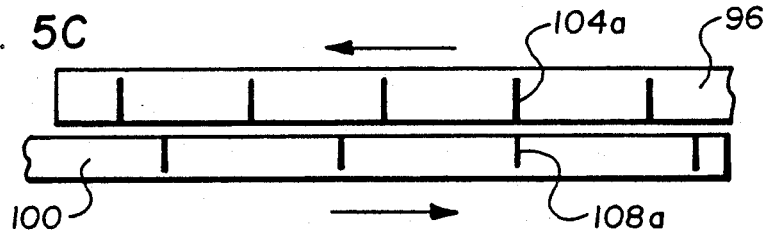

FIG. 5C illustrates relative movement of the arms 96 and 100 when a compressive force is applied to the transducer. In this case, the endmost force field emitters become misaligned with the endmost force field detector elements and the second from the right force field emitter 104a comes into alignment with the second from the right force field detector element 108a as shown. When this happens, the force field detector element 108a detects the close proximity of the force field emitter 104a to provide a readout indicating the magnitude of relative movement of the arms. Continued relative movement of the arms 96 and 100 as shown in FIG. 5C will ultimately bring into alignment the third from the right force field emitter and force field detector element, etc., to progressively provide a readout of the movement of the arms.

Figure 5D:
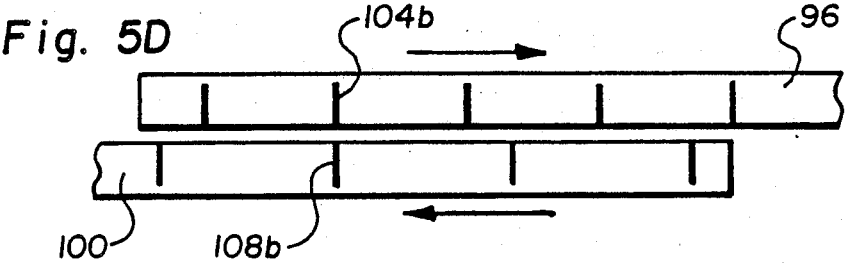

FIG. 5D shows relative movement of the arms 96 and 100 when the transducer is subjected to a stress so that the second from the left force field emitter 104b comes into alignment with the second from the left force field detector element 108b. With this alignment and close proximity, a readout of the force field detector element 108b would provide an indication of the magnitude of relative movement of the arms. Similarly, as the arms 96 and 100 continue relative movement as indicated in FIG. 5D, then the second from the left force field emitter and force field detector element come into alignment, etc.

FIG. 6 shows a top, plan view of another embodiment of a strain transducer which utilizes the Vernier principle. This transducer includes a flexible generally planar frame member 120 having a pair of load-bearing, spaced-apart generally parallel rails 124 and 128, a pair of bonding pads 132 and 136 extending respectively from respective ends of rails 124 and 128, and a plurality of spaced-apart laterally flexible connecting struts 140 and 144 extending between and joining the rails 124 and 128. Also included are a pair of co-planar plates 148 and 152 which extend respectively from rails 124 and 128 toward one another so that the adjacent free edges 150 and 154 of plates 148 and 152 respectively are generally parallel with one another. A plurality of force field emitters 156 are disposed on the upper surface of the frame member 120 and spaced apart longitudinally along plate 148 at the free edge 150. Each of the force field emitters 156 might illustratively comprise an elongate conductor extending from a common buss 164 (also formed on the top surface of the frame member 120) to the edge 150 of the plate 148. The common buss 164 is shown in FIG. 6 connected to a single voltage source 166, but each of the emitters 156 could be coupled to individual voltage sources having either different voltage levels or substantially the same voltage level. Formed on the other plate 152 are a multiplicity of force field detector elements which are spaced apart longitudinally along the plate near the free edge 154. Advantageously, the force field detector elements 160 comprise elongate conductors, which serve as gates of FETS and which extend from a buss 168 deposited on the top surface of a frame member 120 to the free edge 154 of the plate. The buss 168, in this case, would contain individual leads or conductors for each of the conductor strips 160 for ultimate connection to a different FET. Alternatively, the force field detector elements 160 could be individual FETS deposited on the top surface of the frame member 120 so that the gate regions thereof were disposed adjacent to or at the edge of the free edge 154 of the plate 152.

As with the embodiment of FIGS. 5A through 5D, the FIG. 6 embodiment is a type of Vernier scale arrangement and movement of the rails 124 and 128 relative to one another would be detected and determined by which ones of the force field emitters 156 were in closest proximity to corresponding ones of the force field detector elements, in the manner described for the FIGS. 5A through 5D embodiment.

The FIG. 6 transducer may be readily manufactured using conventional microfabrication technology to position the force field emitters 156 and force field detector elements 160 so that they extend towards one another to almost touch. After fabrication, the free edges 150 and 154 would then be cut, for example, by laser machining, chemical etching, mechanical sawing, etc., to provide a precise parallel arrangement between the edges and to leave exposed the force field emitters at edge 150 and the force field detector elements at edge 154.

FIG. 7 shows a top-plan view of an acceleration force transducer which includes a substrate frame 200. The frame includes a pair of generally parallel, spaced-apart rails 204 and 208 and bonding pads 212 and 216 joined to respective ends of the rail 204. The rail 208 is connected by laterally flexible cross struts 220 and 224 to the rail 204, as previously described. Fingers 228 and 230 project from rail 204 towards rail 208 to locations between finger pairs 232 and 236 respectively, which, in turn, project from rail 208 toward rail 204. Force field emitters are disposed on fingers 228 and 230 and force field detecting elements are disposed on finger pairs 232 and 236, all as earlier described for other embodiments of the invention. Mounted on rail 208 is an elongate weight 240 which, when the frame 200 is accelerated longitudinally either to the right or to the left FIG. 7, causes rail 208 to move relative to rail 204 in a direction opposite that of the acceleration. This is indicated by the arrow 244. When rail 208 is caused to move relative to rail 204, then the pairs of fingers 232 and 236 are caused to move relative to fingers 228 and 230 and this movement is detectable by the force detector elements deposited on the pairs of fingers 232 and 236. In this manner, the acceleration to which the frame 200 is being subjected can be detected and measured.

FIG. 8 shows a top, plan view of a force transducer in which the magnitude, but not the direction, of the force can be determined. This transducer is formed from a single piece of material to include an annular substrate 300 on which is disposed an FET 302 having a source region 303, a gate region 304, and a drain region 305, and a centrally positioned substrate piece 312 supported by integrally formed springs 316. An electric field emitter 320 is disposed on the substrate piece 312. The FET 302 is coupled to signal processing circuitry 308.

As the substrate 300 is accelerated in some direction, the substrate 312 which is suspended by springs 316 and not attached to the object being accelerated is caused to move relative to the substrate 300 in a direction opposite the direction of acceleration. This movement is detected by the FET 302 due to a change in the proximity between the emitter 320 and the gate 304 as previously described. The magnitude of the acceleration of the substrate 300 in any direction is determined by the proximity of the emitter 320 to the gate region 304, but the direction of acceleration cannot be determined by the FIG. 8 transducer.

FIG. 9 shows a top, plan view of an alternative embodiment of an acceleration force transducer in which the magnitude of acceleration along one axis 400, in either direction, can be determined. This transducer includes a circular substrate 404 with integrally formed flexible struts 412 and 416 extending inwardly from the substrate 404. A semicircular FET 420 (having a source region and drain region positioned on each side of a gate region) and a semicircular FET 424 are disposed on the substrate 404, each FET being connected to a respective one of signal processing circuits 428 and 432. Held in place in the center of the substrate 404 is an integrally formed substrate 436 on which is disposed an electric field emitter 440. As the substrate 404 is accelerated to the right along axis 400, the support struts 412 and 416 flex to the let causing the emitter 440 to move closer to the gate of FET 420, and this causes both FET 420 and FET 424 to produce signals indicating the change in the proximity of the emitter 440 with respect to the gates of FETS 420 and 424, as previously described. Similarly, if the substrate 404 is accelerated to the left, then the support struts 412 and 416 are caused to flex to the right moving the emitter 440 into closer proximity to the gate of FET 424 and farther from the gate of FET 420. This change in proximity would again be reflected by the signal outputs of the FETS 420 and 424. In the manner described, both the magnitude and the direction along axis 400 of an acceleration force can be determined.

FIG. 10 shows a top plan view of a biaxial force transducer in which magnitude and four directions of acceleration force can be determined. The transducer of FIG. 10 includes a circular substrate 500, on which are disposed quarter circle MAGFETS 516, 520, 524 and 528. Each of these MAGFETS are connected to a respective one of the signal processing circuits 532, 536, 540 and 544. MAGFET 528 is shown in detail to include a source region 529, gate region 530 and two drain regions 531a and 531b. Although not shown in FIG. 10, the other MAGFETS would be similarly constructed. Suspended in the center of the substrate 500 by integrally formed mechanical springs 548 is a substrate 552 on which is disposed a magnetic field emitter 556. From an examination of FIG. 10, it can be visualized how acceleration of the substrate 500 generally along either of the axes defined by springs 548 would result in one of the MAGFETS producing a signal indicating closer proximity between that MAGFET and the emitter 556 and one of the MAGFETS producing a signal indicating that the emitter 556 has moved away from that MAGFET. In this manner, the magnitude of acceleration force in either direction along two different and orthogonal axes can be determined.

It would be evident that in a manner similar to that described in FIGS. 9 and 10 transducers, a transducer could be provided having a circular substrate and circular gate region segmented to as to provide measurements of acceleration force which may occur along a multiplicity of axes. The measurements would be both of the magnitude of the acceleration force and the direction along the particular axis in which the acceleration occurred.

Figure 11A:
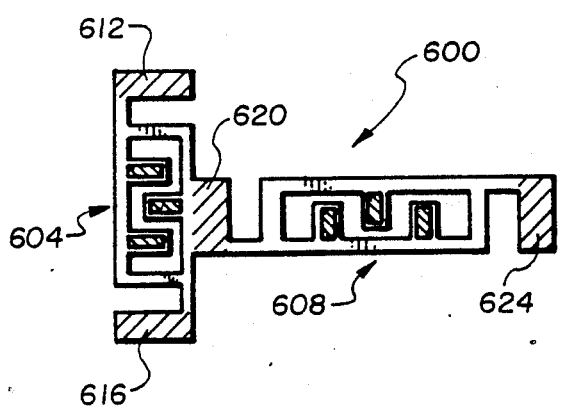
FIGS. 11A, 11B and 11C show graphic top, plan view representations of three embodiments of rosette strain transducers made in accordance with the principles of the present invention.
Figure 11B:
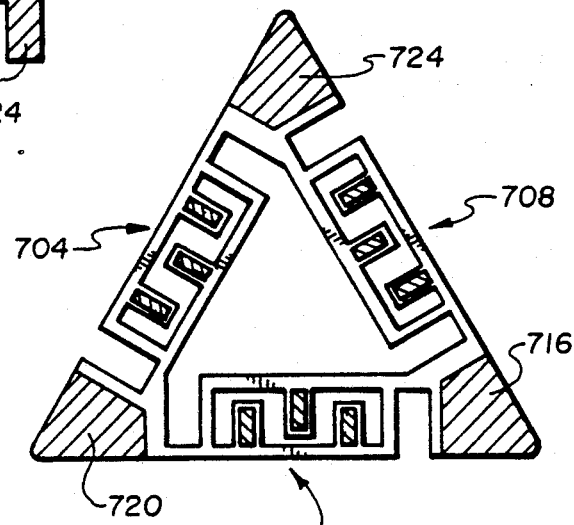
Figure 11C:
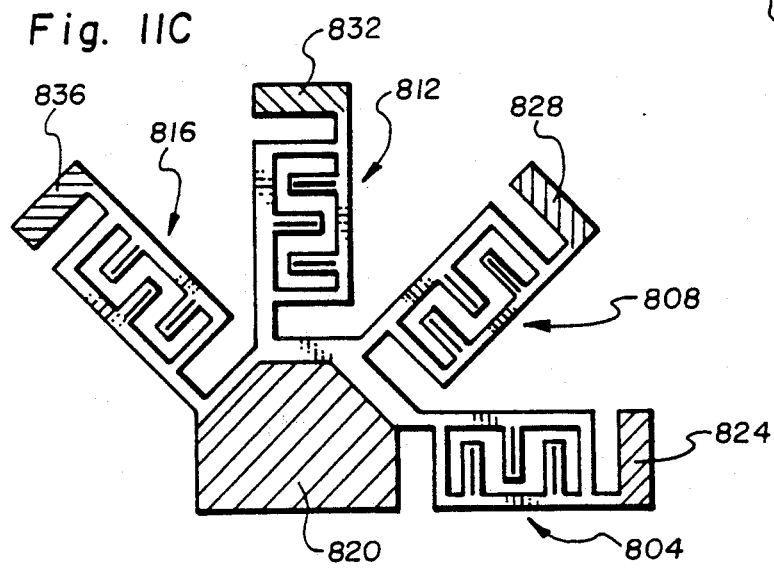

FIGS. 11A, 11B and 11C show graphic top plan view representations of a two-element rosette strain transducer for measuring strains in two orthogonal directions, a three-element rosette strain transducer and a four-element rosette strain transducer. In FIG. 11A, the rosette includes a single substrate 600 formed in the shape of a "T" and cut or etched to accommodate two FET- or MAGFET-based strain transducers 604 and 608, similar to the transducer shown in FIG. 1. Transducer 608 is positioned perpendicularly to transducer 604 as shown. The substrate 600 is made of a flexible material such as the substrate materials discussed earlier. Bonding pads 612 and 616 of transducer 604 and bonding pads 620 and 624 of transducers 608 are provided for attaching the rosette to the object whose strain is to be measured, with the long axis of each transducer 604 and 608 positioned to coincide generally with the directions in which strain is expected in the object. Such strain will thus be measured by the two transducers 604 and 608.

FIG. 11B shows a three-element rosette strain transducer, with three FET- or MAGFET-based strain transducers 704, 708 and 712 formed from a single piece of material and disposed to form an equilateral triangle. Adjacent ends of the transducers 704, 708 and 712 share common bonding pads 716, 720 and 724. The three-element rosette configuration of FIG. 11B can be used to measure and define a strain field in an object since, as is well known, a strain field can be defined by measurement of three strains at a location on the object.

FIG. 11C shows still another rosette strain transducer, but with four FET- or MAGFET-based strain transducers 804, 808, 812 and 816 arranged on a substrate 800 with their long axes oriented at an angle of 45° apart, for adjacent transducers. The transducers 804, 808, 812 and 816 all share one common bonding pad 820 at one of their ends, but have separate bonding pads 824, 828, 832 and 836 respectively at their other ends. The rosette strain transducer of FIG. 11C can also measure and define the strain field of an object on which it is mounted, by measuring four strains (rather than three as with the FIG. 11B configuration) at a location on the object. Measuring four strains provides better resolution of the strain field.

A variety of rosette strain transducer configurations could be provided for measuring strain fields, with FET- or MAGFET-based transducers arranged in various patterns and formed from a single substrate.

Figure 12:
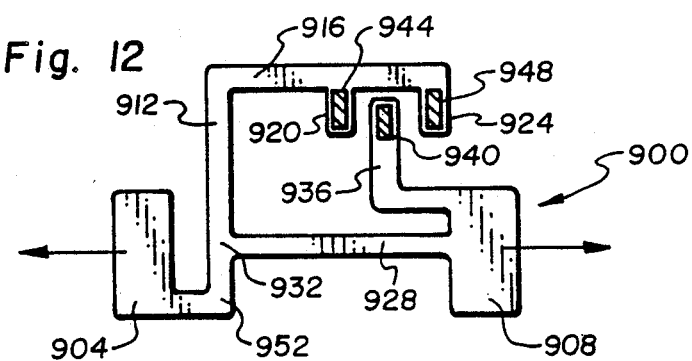
FIG. 12 shows a top, plan view of a strain transducer with mechanical amplification.

FIG. 12 shows a strain transducer constructed to have a lever-action mechanical amplification feature. This transducer includes a flexible frame 900 having two bonding pads 904 and 908 and a lever arm 912 joined at one end to the bonding pad 904 and formed at the other end with a laterally extending arm 916 having two fingers 920 and 924 projecting downwardly parallel to one another and to the arm 912. A base arm 928 extends from the bonding pad 908 to join the lever arm 912 at a pivot location 932 positioned between the ends of the arm 912. An arm 936 extends from bonding pad 908 to a location between the fingers 920 and 924. A force field emitter 940 is disposed on the free end of the arm 936 and two detector elements 944 and 948 are disposed on fingers 920 and 924 respectively.

Movement of the bonding pads 904 and 908 away from one another or toward one another causes the lever arm 912 to pivot about pivot points 932 and 952 towards the arm 936 or away from the arm 936 respectively, so that the detector elements 944 and 948 move relative to the emitter 940. The movement of the end of the lever arm 912 which is joined to the arm 916 and thus the movement of the detector elements 944 and 948 relative to the emitter 940 is an amplification of the movement of the bonding pads 904 and 908 by an amount proportional to the ratio of the length of the arm 912 from the pivot point 952 to the arm 916, to the length of the arm 912 from the pivot point 932 to the pivot point 952. The greater this ratio, the greater is the amplification of movement.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. A lever-action transducer for measuring strain in an object on which the transducer is disposed, said transducer comprising a flexible generally planar frame member having a working surface, said frame member including first and second spaced-apart bonding pads for attachment to the object, a lever arm disposed between the bonding pads to extend from a first end to a second end generally perpendicular to an imaginary line extending between the pads, an arm joining the first end of the lever arm to the first bonding pad, a base arm extending between the second bonding pad and the lever arm and joined to the lever arm at a location between the first and second ends and closer to the first end, a support arm extending laterally from the second end of the lever arm and including at least one projection extending toward the base arm, and a pull arm extending from the second bonding pad to a free end positioned beside, but spaced from the projection, means disposed on the working surface of the free end of the null arm for producing a force field which emanates therefrom and which diminishes in strength the greater the distance from the force field producing means, and detection means disposed on the working surface of the projection for detecting the presence of a force field and for producing signals representing force field strength and thus the distance of the detection means from the force field producing means.

* * * * *